(12) United States Patent
Karuppiah et al.

(10) Patent No.: US 8,614,967 B2
(45) Date of Patent: Dec. 24, 2013

(54) TERMINAL DEVICES AND PACKET TRANSMITTING METHOD

(75) Inventors: Ettikan Kandasamy Karuppiah, Selangor (MY); Eiichi Muramoto, Kanagawa (JP); Thilmee Baduge, Osaka (JP)

(73) Assignee: Panasonic Corporation, Osaka (JP)

( * ) Notice: Subject to any disclaimer, the term of this patent is extended or adjusted under 35 U.S.C. 154(b) by 58 days.

(21) Appl. No.: 13/143,788

(22) PCT Filed: Dec. 24, 2009

(86) PCT No.: PCT/JP2009/007198
§ 371 (c)(1),
(2), (4) Date: Sep. 1, 2011

(87) PCT Pub. No.: WO2010/082281
PCT Pub. Date: Jul. 22, 2010

(65) Prior Publication Data
US 2011/0305169 A1    Dec. 15, 2011

(30) Foreign Application Priority Data
Jan. 14, 2009 (JP) .................. 2009-005924

(51) Int. Cl.
*H04L 12/50* (2006.01)

(52) U.S. Cl.
USPC ............ 370/256; 370/390; 370/389; 370/392

(58) Field of Classification Search
USPC ....................................... 370/256
See application file for complete search history.

(56) References Cited

U.S. PATENT DOCUMENTS

| 5,377,123 A * | 12/1994 | Hyman | 716/136 |
| 6,252,857 B1 * | 6/2001 | Fendick et al. | 370/254 |

(Continued)

FOREIGN PATENT DOCUMENTS

| JP | 2007-235681 | 9/2007 |
| JP | 2008-263449 | 10/2008 |

(Continued)

OTHER PUBLICATIONS

George Popescu et al., "Stateless application-level multicast for dynamic group communication", Proceedings of the Eighth IEEE International Symposium on Distributed Simulation and Real-Time Applications (DS-RT 20004), IEEE, Oct. 21, 2004, IBM T. J. Watson Research Center, pp. 20-28.

(Continued)

*Primary Examiner* — Ian N Moore
*Assistant Examiner* — Lakeram Jangbahadur
(74) *Attorney, Agent, or Firm* — Greenblum & Bernstein, P.L.C.

(57) ABSTRACT

After a delivery tree is reorganized by a local processing, all terminal devices can recognize, in a short time, a delivery route as changed. In a local one of the terminal devices, if the local terminal device is a source node and further if the load of the CPU in any one of nodes exceeds a threshold value or the available band of the circuit line between nodes exceeds a threshold value, then a delivery tree organizing unit (462) determines nodes that receive a packet via such nodes and reselects a delivery route of the determined nodes. A packet structure modifying unit (464), if the local terminal device is the source node, modifies the header of a packet in accordance with delivery route information stored in a delivery route database (412). The packet structure modifying unit (464) then instructs, in accordance with the description of the header, a packet replicating unit (426) on a number of packet replicas and on the transmission destination of the packets.

2 Claims, 6 Drawing Sheets

(56) References Cited

U.S. PATENT DOCUMENTS

| | | | |
|---|---|---|---|
| 6,330,286 B1* | 12/2001 | Lyons et al. | 375/240.28 |
| 6,538,989 B1* | 3/2003 | Carter et al. | 370/229 |
| 6,816,467 B1* | 11/2004 | Muller et al. | 370/256 |
| 7,203,944 B1* | 4/2007 | van Rietschote et al. | 718/104 |
| 7,254,138 B2* | 8/2007 | Sandstrom | 370/412 |
| 7,436,836 B2* | 10/2008 | Mushtaq et al. | 370/392 |
| 7,525,912 B2* | 4/2009 | Yazaki et al. | 370/230.1 |
| 7,554,978 B1* | 6/2009 | Parker | 370/389 |
| 7,586,929 B2* | 9/2009 | Mizutani et al. | 370/422 |
| 7,649,890 B2* | 1/2010 | Mizutani et al. | 370/395.21 |
| 7,881,198 B2* | 2/2011 | Monette et al. | 370/235 |
| 7,908,298 B1* | 3/2011 | Lancaster | 707/805 |
| 8,089,905 B2* | 1/2012 | Umeshima | 370/256 |
| 8,316,190 B2* | 11/2012 | Holt | 711/148 |
| 2003/0097438 A1* | 5/2003 | Bearden et al. | 709/224 |
| 2008/0133767 A1* | 6/2008 | Birrer et al. | 709/231 |
| 2009/0238183 A1* | 9/2009 | Wu | 370/390 |
| 2009/0327509 A1 | 12/2009 | Roussel et al. | |
| 2011/0002333 A1 | 1/2011 | Karuppiah et al. | |
| 2011/0044336 A1 | 2/2011 | Umeshima | |

FOREIGN PATENT DOCUMENTS

| | | |
|---|---|---|
| JP | 2010-500804 | 1/2010 |
| WO | 2008/017792 | 2/2008 |

OTHER PUBLICATIONS

Japan Office action, mail date is Nov. 13, 2012.

Japan Office action, mail date is Aug. 7, 2012.

Dimitrios Pendarakis dpendarakis@tellium.com et al., "ALMI: An Application Level Multicast Infrastructure", Tellium Optical Network Systems / Proc. of 3rd Usenix Symp. on Internet Technologies, 2001, pp. 1-12.

Min Sik Kim minskim@cs.utexas.edu et al., "Optimal Distribution Tree for Internet Streaming Media", Proceedings of 23rd IEEE ICDCS, Sep. 2002, revised 2003. Department of Computer Sciences. The University of Texas at Austin, Texas, Apr. 2003, pp. 1-22.

* cited by examiner

| NODE | A | B | C | ... | M |
|---|---|---|---|---|---|
| INFORMATION | | | | | |

| | CPU LOAD | 602 |
| | UPLOAD BANDWIDTH | 604 |
| | NODE DEPTH | 608 |
| | NODE WIDTH | 608 |
| | NUMBER OF DESCENDENT NODES | 610 |

| SOURCE \ NODE | A | B | C | ... | M |
|---|---|---|---|---|---|
| A | ▨ | | | | |
| B | | ▨ | | | |
| C | | | ▨ | | |
| ... | | | | ▨ | |
| M | | | | | ▨ |

| | 802 INCOMING·DOWNLOAD LINK USED BANDWIDTH CAPACITY |
|---|---|

| NODE | SOURCE NODE | DESTINATION NODE |
|---|---|---|
| A | — | B,C,D |
| B | A | E,F,G |
| C | A | H,I,J |
| D | A | K,L,M |
| E | B | — |
| F | B | — |
| G | B | — |
| H | C | — |
| I | C | — |
| J | C | — |
| K | D | — |
| L | D | — |
| M | D | — |

TERMINAL DEVICES AND PACKET TRANSMITTING METHOD

TECHNICAL FIELD

The present invention relates to a terminal apparatus and packet transmission method for reconstructing a delivery tree by local processing in ALM (Application Layer Multicast).

BACKGROUND ART

ALM (Application Layer Multicast) refers to a function of implementing multicast functions such as packet replication and routing (that is, construction of a tree-structured delivery route) in a network formed with multipoint nodes (=terminal apparatuses).

When video data is delivered in packets by ALM on the Internet, to maintain the quality of video to be delivered, it is necessary to adjust the CPU (central processing unit) load balance between nodes and also adjust the bandwidth to use between nodes.

Consequently, a method has been adopted heretofore whereby a centralized management server monitors the CPU load of all nodes and channel bandwidth availability between nodes and reconstructs a delivery tree when the CPU of a specific node is overloaded or the equality of channel bandwidth availability is not secured between certain nodes.

However, with this method, when the number of nodes (the number of users to participate in a video delivery session) increases, the centralized management server suffers increased processing load and the network traffic around the centralized management server increases. This then raises the problem that the centralized management server is unable to finish the required processing in a predetermined period of time.

Also, when a network channel is congested between nodes, the bandwidth that is available for use for communication between nodes decreases, and video data packet loss occurs. This then raises the problem that the quality of video which a node located in the downstream of a delivery tree receives and plays, is degraded.

Furthermore, when the number of nodes increases, it is necessary to deliver information showing the configuration of a new delivery route calculated by the centralized management server, from that centralized management server to all nodes. Consequently, delivery route updating suffers extra delay and the timing to change a delivery route to an unoccupied channel is delayed, raising, as a result, the problem that the time to use a congested channel becomes longer and the state in which a node has to receive and play poor video lasts longer. A node of high CPU load replicates and transfers packets for a prolonged period of time, and consequently the state in which a node in the downstream has to receive and play poor video lasts longer.

Consequently, in a network in which the number of nodes is large, it is desirable to reconstruct a delivery tree locally in order to change the delivery route and adjust the CPU load in order to avoid congested channels.

Patent literature 1 proposes a method of adjusting CPU load by monitoring the CPU load of a plurality of virtual machines and adjusting the tasks to assign to the virtual machines.

Also, patent literature 2 proposes a method of transferring packets on a different delivery path from normal unicast, in packet transfer between routers. To be more specific, patent literature 2 discloses a method of monitoring the length of the buffer of every router (that is, queue to accumulate packets to deliver) and changing the delivery path on a dynamic basis based on this.

Non-patent literature 1 proposes a delivery tree reconstructing method in ALM.

Also, non-patent literature 2 proposes a delivery tree constructing method to maximize the number of bandwidths available for use, by searching for a node which each node can connect with (that is, parent node).

CITATION LIST

Patent Literature

PTL 1
U.S. Pat. No. 7,203,944 specification
PTL 2
U.S. Pat. No. 7,254,138 specification

Non-Patent Literature

NPL 1
Dimitrios Pendarakis and Sherlia Shi and Dinesh Verma and Marcel Waldvogel, "ALMI: An Application Level Multicast Infrastructure", Proc. of 3rd Usenix Symp. on Internet Technologies, 2001
NPL 2
Min Sik Kim et. al, "Optimal Distribution Tree for Internet Streaming Media", Proc. of 23rd IEEE ICDCS, May, 2003

SUMMARY OF INVENTION

Technical Problem

However, with the prior art, after a delivery tree is reconstructed locally, it is necessary to exchange information about the source node and destination node of a new packet between nodes using different packets. Consequently, with the prior art, there is a problem that it takes time until all terminal apparatuses identify a changed delivery route.

Incidentally, patent literature 1 does not presume use for video data delivery between virtual machines, and does not describe a method of constructing a delivery tree between virtual machines.

Furthermore, according to patent literature 2, each router simply monitors its own buffer, and is not able to change the path taking into account the condition of load at neighboring routers and transfer destination routers and bandwidth availability.

Furthermore, with the technique of non-patent literature 1, in order to update a delivery tree, it is necessary to report a new delivery route, which is calculated by a centralized management server, in a control message. Consequently, with the technique of non-patent literature 1, it takes time to change a delivery route.

Furthermore, according to non-patent literature 2, it is necessary to exchange between nodes the same control message as when withdrawing participation, in order to change a delivery route. Consequently, with non-patent literature 2, it is necessary to follow the same procedures as when reconstructing a whole delivery tree.

It is therefore an object of the present invention to provide a terminal apparatus and packet transmission method that allow, after a delivery tree is reconstructed by local processing, all mobile apparatuses to identify the changed delivery route quickly.

Solution to Problem

The terminal apparatus of the present invention, in a network that is formed with a plurality of terminal apparatuses and that reconstructs a delivery tree locally, employs a configuration having: a delivery tree constructor that, when the terminal apparatus is a terminal apparatus to reconstruct a delivery tree, selects a packet delivery route such that central processing unit load of all terminal apparatuses or channel bandwidth availability between the terminal apparatuses does not exceed a threshold; a packet structure modifier that, based on the delivery route, rewrites the header part of an input packet, and sets the number of replicated packets and terminal apparatuses to be packet destinations; and a packet processor that creates replications of the packet in which the header part is rewritten by the packet structure modifier, the number of the replications of the packet being determined by the packet structure modifier, and transmits the replicated packets to the destination terminal apparatuses set by the packet structure modifier.

The packet transmission method of the present invention, for a terminal apparatus in a network that is formed with a plurality of terminal apparatuses and that reconstructs a delivery tree locally, includes: a delivery tree construction step of, when the terminal apparatus is a terminal apparatus to reconstruct a delivery tree, selecting a packet delivery route such that central processing unit load of all terminal apparatuses or channel bandwidth availability between the terminal apparatuses does not exceed a threshold; a packet structure modification step of, based on the delivery route, rewriting the header part of an input packet, and setting the number of replicated packets and terminal apparatuses to be packet destinations; and a packet processing step of creating replications of the packet in which the header part is rewritten in the packet structure modification step, the number of the replications of the packet being determined in the packet structure modification step, and transmitting the replicated packets to the destination terminal apparatuses set in the packet structure modification step.

Advantageous Effects of Invention

According to the present invention, when there is need to reconstruct a delivery tree, only the header part of a packet is rewritten, so that a node is able to learn a new delivery route and specify a packet destination simply by deciphering the header part of a received packet. By this means, after a delivery tree is reconstructed by local processing, all terminals are able to identify the changed delivery route quickly.

DESCRIPTION OF EMBODIMENTS

Embodiments of the present invention will be described in detail with reference to the accompanying drawings.

Figure 1:
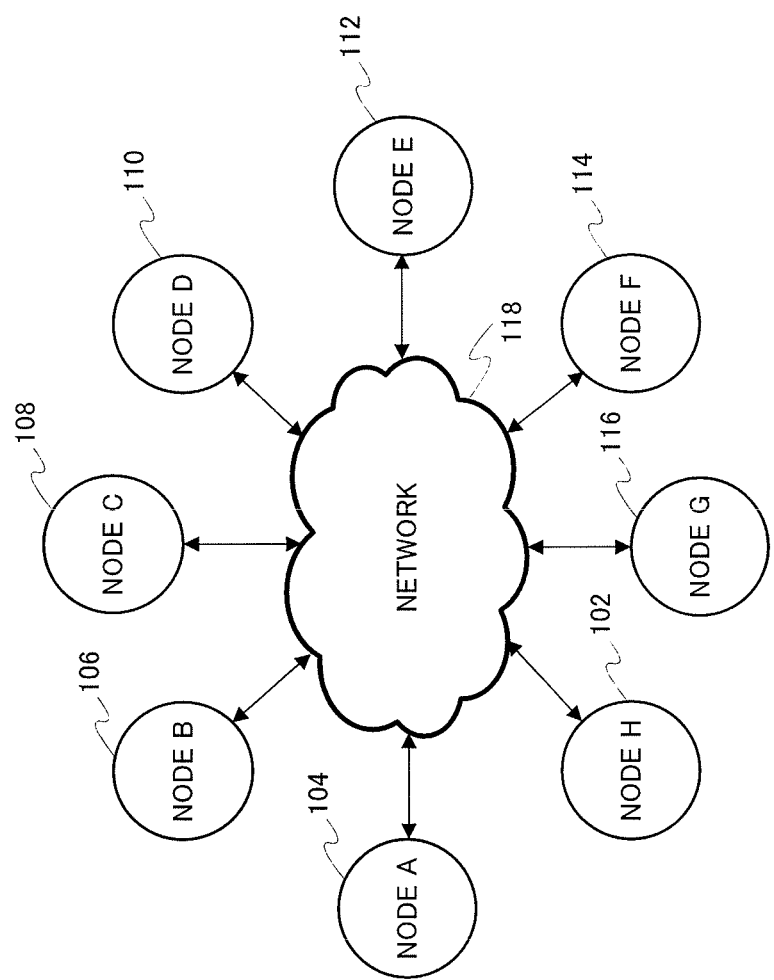
FIG. 1 shows a network according to an embodiment of the present invention.

FIG. 1 shows a network according to an embodiment of the present invention. As shown in FIG. 1, according to the present embodiment, a plurality of nodes 102, 104, 106, 108, 110, 112, 114 and 116 are connected to network 118. Multimedia applications that are present in nodes are able to mutually exchange streams during an ALM session. Each node in FIG. 1 is able to communicate with other nodes, and, by mutually exchanging network information, learns the packet delivery route.

With the present invention, the terms "node" and "entity," which refer to a physical network entity and a theoretical network entity, are interchangeable. Furthermore, a node and an entity are both terminal apparatuses in a communication system.

With the present invention, a source node to execute construction of a delivery tree continues collecting CPU parameters that show the CPU load of that source node and neighboring nodes and network parameters that show the state of channel bandwidth availability between nodes. Next, the source node reconstructs the delivery tree when a CPU parameter or a network parameter exceeds a predetermined threshold.

Here, packet loss rate, increase and decrease of transmission delay and so on are examples of network parameters. The source node is able to watch the packet loss rate by monitoring the sequential numbers in packets. Furthermore, the source node is able to watch the propagation delay by monitoring the difference between the time information affixed in the header of a packet by the source, and the time the source node receives the packet.

Now, tree reconstructing method and packet transmission method the present invention according to an embodiment will be described using FIG. 2 and FIG. 3.

Figure 2A:
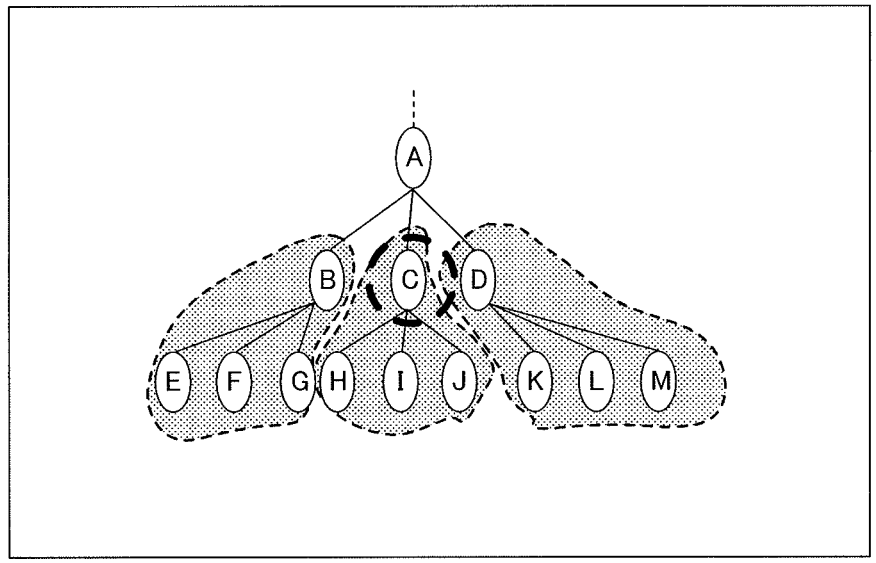
FIG. 2 shows an example of a delivery route of a node group forming a local network according to an embodiment of the present invention.
Figure 2A:

FIG. 2 shows an example of a delivery route of a node group forming a local network. In FIG. 2, thirteen nodes (A, B, C, D, E, F, G, H, I, J, K, L, M) form a local network.

FIG. 3 shows a structure of a transmission packet in the example of FIG. 2. In packet 302, src 304, dest 306, bitmap 308, tree_map 310, and payload filter 312 are provided. Also, in packet 302, src 304, dest 306, bitmap 308 and tree_map 310 form the header part.

src 304 is a column in which unique properties (e.g. IP address) of a source node to construct a delivery tree are written, and dest 306 is a column in which unique properties of different nodes from the source node are written. In dest 306, unique properties are written in order from the node of the highest layer in the delivery tree (in FIG. 3, from the left). Also, in dest 306, for those nodes belonging to the same layer, unique properties are written following the order of nodes in the layer one layer above. That is, in dest 306, a delivery tree is written in dest 306, in the form of a list, on a breadth-first basis.

Bitmap 308 is a column in which bitmap information to show whether or not each node has to replicate a packet is written, in the order of the unique properties of src 304 and dest 306. That is, bitmap information shows whether or not each node is obligated to transmit a packet to another node. In bitmap 308, "1" is written when a corresponding node has to replicate a packet or "0" is written otherwise. When a router (not shown) replicates a packet and distributes replicated packets, the router references bitmap 308 to record whether or not delivery has been made to a destination.

Tree_map 310 is a column where number-of-packet information to show the number of packets which each node needs to replicate is written in the order of unique properties of scr 304 and dest 306. That is, number-of-packet information shows the number of delivery tree branches that derive from a node.

Payload filter 312 is a column where the data is written.

A node to receive packet 302 shown in FIG. 3 is able to learn the number of replicated packets and the destinations of the replicated packets by deciphering the header part of packet 302.

Figure 2B:
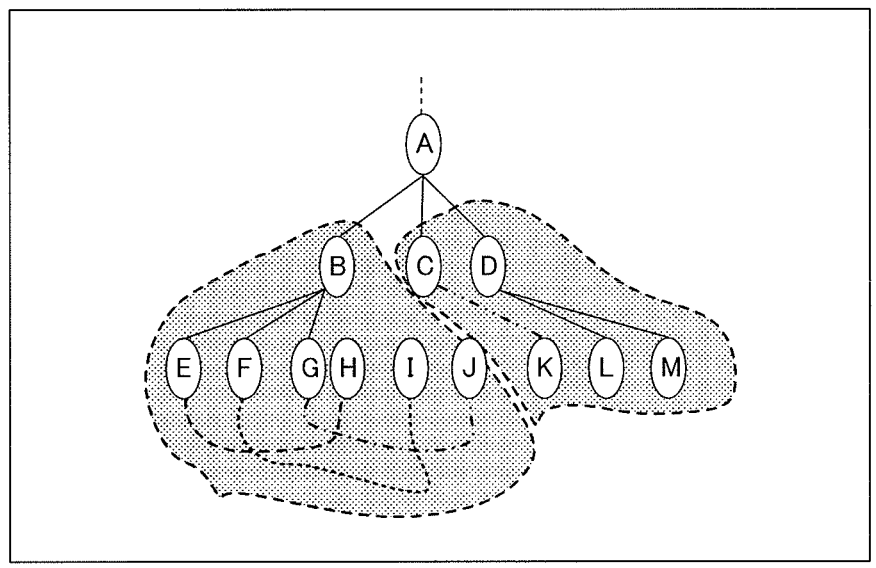
Figure 3A:
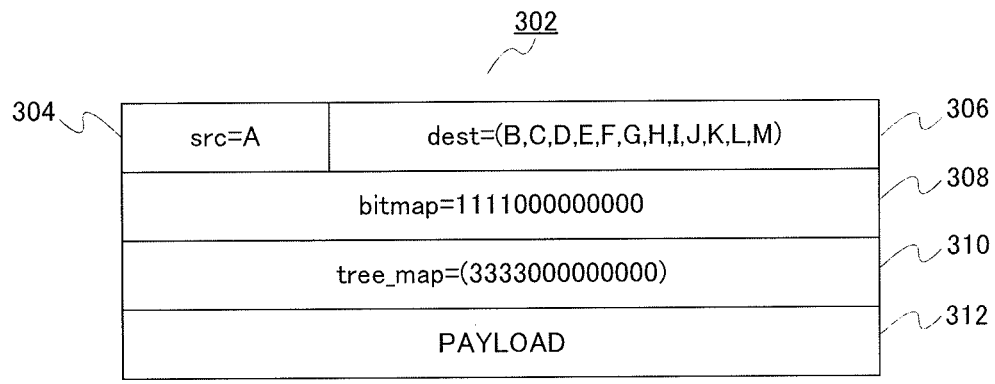
FIG. 3 shows a structure of a transmission packet structure in the example of FIG. 2.
Figure 3B:
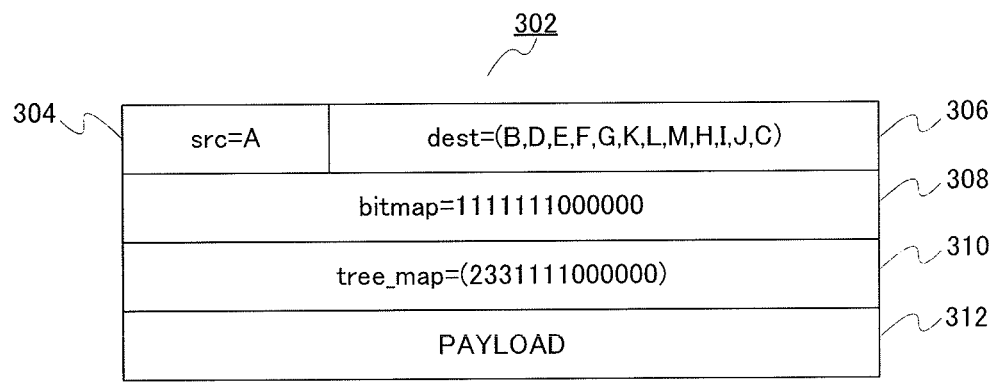

FIG. 2A and FIG. 3A show a state before a delivery tree is reconstructed and FIG. 2B and FIG. 3B show a state after a delivery tree is reconstructed.

In FIG. 2A, delivery routes are formed from source node A to three nodes B, C and D, and furthermore delivery routes are formed from node B to three nodes E and F and G. In FIG. 2A, delivery routes are formed from node C to three nodes H, I and J, and furthermore delivery routes are formed from node D to nodes K, L and M. Packets are delivered to each node following these delivery routes. That is to say, a packed that is received in source node A is forwarded from source node A to nodes B, C and D, and likewise forwarded from node B to nodes E and F and G, from node C to nodes H, I and J, and from node D to nodes K, L and M.

In the case of the delivery route shown in FIG. 2A, source node A writes the header part of received packet 302 as shown in FIG. 3A. That is to say, source node A writes the source node's (its) unique property "A" in src 304. Also, source node A writes unique properties "B, C, D, E, F, G, H, I, J, K, L, M" of different nodes from the source node, in dest 306, in this order. Furthermore, source node A writes bitmap information "1111000000000" in bitmap 308, following the order of src 304 and dest 306. Furthermore, source node A writes number-of-packet information "3333000000000" in tree_map 310, following the order of src 304 and dest 306.

By this means, given that the first value in tree_map 310 corresponding to src 304 (source node A) is "3," source node A creates three replications of packet 302. Then, source node A transmits packets 302 to the first three nodes B, C and D in dest 306.

Nodes B, C and D having received packets 302 from source node A each create three replications of packet 302, given that the values of tree_map 310 in positions corresponding to their unique properties in dest 306 are "3." Then, given the fact that source node A, which is the source, has created three replications of packet 302, nodes B, C and D are able to know that nodes B, C and D belong to the same layer.

Furthermore, node B, given that its unique property comes first in dest 306, transmits replicated packets 302 to the first node (that is, the next node after node D) to the third node, namely nodes E, F and G, in the layer one layer below, in dest 306.

Furthermore, node C has its unique property come next after node B in dest 306, and the value of node B in tree_map 310 is "3." By this means, node C transmits replicated packets 302 to three nodes from the fourth node (that is, the next node after node G) in the layer one layer below in dest 306, namely nodes H, I and J.

Furthermore, node D has its unique property come next after nodes B and C in dest 306, and the value of node B in tree_map 310 is "3" and the value of node C in tree_map 310 is "3." By this means, node D transmits replicated packets 302 to three nodes from the seventh node (that is, the next node after node J) in the layer one layer below in dest 306, namely nodes K, L and M.

For nodes E, F, G, H, I, J, K, L and M, the values of tree_map 310 in locations corresponding to their unique properties in dest 306 are "0," so that nodes E, F, G, H, I, J, K, L and M do not replicate packet 302.

By this means, as shown in FIG. 3A, by forming the header part of packet 302 as shown in FIG. 3A, each node is able to learn the delivery route of FIG. 2A only by deciphering the header part of packet 302. By this means, packets 302 are delivered to all nodes, without overlap.

Next, a case will be described where the CPU of node C is overloaded in the state of delivery routes shown in FIG. 2A. In this case, source node A reconstructs a delivery tree as shown in FIG. 2B. In the case of delivery routes shown in FIG. 2B, source node A rewrites the header part of received packet 302 as shown in FIG. 3B. That is to say, source node A writes the source node's (its) unique property "A" in src 304. Furthermore, node A writes the unique properties of different nodes from the source node, "B, D, E, F, G, K, L, M, H, I, J and C," in dest 306 in this order. Furthermore, source node A writes bitmap information "1111111000000" in bitmap 308, following the order of src 304 and dest 306. Furthermore, source node A writes number-of-packet information "2331111000000" in tree_map 310, following the order of src 304 and dest 306.

By this means, given that the first value in tree_map 310 corresponding to src 304 (source node A) is "3," source node A creates three replications of packet 302. Then, source node A transmits packets 302 to the first second nodes B and D in dest 306.

Nodes B and D having received packets 302 from source node A each create three replications of packet 302, given that the values of tree_map 310 in positions corresponding to their unique properties in dest 306 are "3." Then, given the fact that source node A, which is the source, has created two replications of packet 302, nodes B and D are able to know that nodes B and D belong to the same layer.

Furthermore, node B, given that its unique property comes first in dest 306, transmits replicated packets 302 to the first node (that is, the next node after node D) to the third node, namely nodes E, F and G, in the layer one layer below, in dest 306.

Furthermore, node D has its unique property come next after node B in dest 306, and the value of node B in tree_map 310 is "3." By this means, node D transmits replicated packets 302 to three nodes from the fourth node (that is, the next node after node G) in the layer one layer below in dest 306, namely nodes K, L and M.

Nodes E, F and G having received packets 302 from node B each create one replication of packet 302, given that the values of tree_map 310 in positions corresponding to their unique properties in dest 306 are "1." Then, given the fact that source node A has created two replications of packet 302, nodes E, F and G are able to know that nodes B and D belong to the same layer. Then, given the fact that source nodes B and D have each created three replications of packet 302, nodes E, F and G are able to know that nodes E, F, G, K, L and M belong to the same layer.

Furthermore, node E, given that its unique property comes first in the same layer in dest 306, transmits replicated packets 302 to node H, which is the first node (that is, the next node after node M) in the layer one layer below, in dest 306. Furthermore, node F has its unique property come next after node E in dest 306, and the value of node E in tree_map 310 is "1." By this means, node F transmits replicated packet 302 to node I, which is the second node (that is, the next node after node H) in the layer one layer below in dest 306.

Furthermore, node G has its unique property come next after nodes E and F in dest 306, and the value of node E in tree_map 310 is "1" and the value of node F in tree_map 310 is "1." By this means, node G transmits replicated packet 302 to node J, which is the third node (that is, the next node after node I) in the layer one layer below in dest 306.

Furthermore, node K has its unique property come next after nodes E, F and G in dest 306. The value of node E in tree_map 310 is "1," the value of node F in tree_map 310 is "1," and the value of node G in tree_map 310 is "1." By this means, node K transmits replicated packet 302 to node C, which is the fourth node (that is, the next node after node J) in the layer one layer below in dest 306.

For nodes L, M, H, I, J and C, the values of tree_map 310 in locations corresponding to their unique properties in dest 306 are "0," so that nodes L, M, H, I, J and C do not replicate packet 302.

Thus, with the present method, when a delivery tree is reconstructed as shown in FIG. 2B in order to reduce the load of node C, the header part of packet 302 is structured as shown in FIG. 3B. By this means, each node is able to learn the delivery route of FIG. 2B only by deciphering the header part of packet 302, and packets 302 are delivered to all nodes, without overlap.

This operation is carried out with respect to packets so that it is possible to update a delivery tree quickly. That is, with prior art it has heretofore been necessary, upon changing the delivery route, to report information to show the destination of delivery using separate control packets from a primary signal packet. However, by using the present method, it is possible to include information about a delivery route in a primary signal and consequently update the delivery tree quickly.

Also, with the present embodiment, information is recorded in tree_map 310 by a method of listing nodes belonging to the same layer first, that is, on a breadth-first basis, not on a depth-first basis. Consequently, a node that replicates and transfers packets has only to search for information in a packet on a top-down basis, and does not have to search a packet thoroughly to the end. By this means, it is possible to determine whether a packet needs to be replicated and transferred, providing an advantage of allowing fast processing.

That is, as a representation of a delivery tree, for example, a delivery tree can be represented in a list form. To be more specific, in FIG. 2, A is connected as a child of S, B and C are connected as A's children, and D, E and F are connected as children of B and C. In this case, based on S as a source, the destinations can be represented as (A-B), (B-D), (B-E), (A-C) and (C-F) can be represented in a list form as destinations. When, for example, node A receives a packet provided in this mode of representation, with the prior art, node A has to search the above-described list entirely, to determine that replicating two packets would be enough. However, with the present embodiment, information is placed on a breadth-first basis, and the number of replicated packets is recorded expressly. Consequently, with the present method, each node is able to know the number of replications and information about the communicating party by reading information from the top of the information, up to a point holding relevance to that node, so that it is possible to skip the troublesome process of searching over information entirely to the end.

As for the unique properties, in addition to information that specifies a terminal on a network such as an IP address, a terminal, upon receiving a packet, might add information to stipulate the method by which the terminal processes that packet. To be more specific, by adding information for determining whether or not to discard a packet, it is possible to reduce the processing load which is required of a terminal for a payback of video or the like. That is, for example, in addition to an IP address, unique properties may note the number given by dividing the serial number of a video picture by a specific integer. To be more specific, for example, the remainder after division by the integer 3 may be additionally noted, and, an operation to move onto processing of playing a packet only when this part of characteristic information is equal to 0, may be carried out. This operation allows a picture to be decimated and played at the same time. That is to say, such a control is made possible whereby, while all pictures are forwarded to terminals in the downstream, a terminal having received a packet plays back that packet at a ⅓ frame rate.

Figure 4:
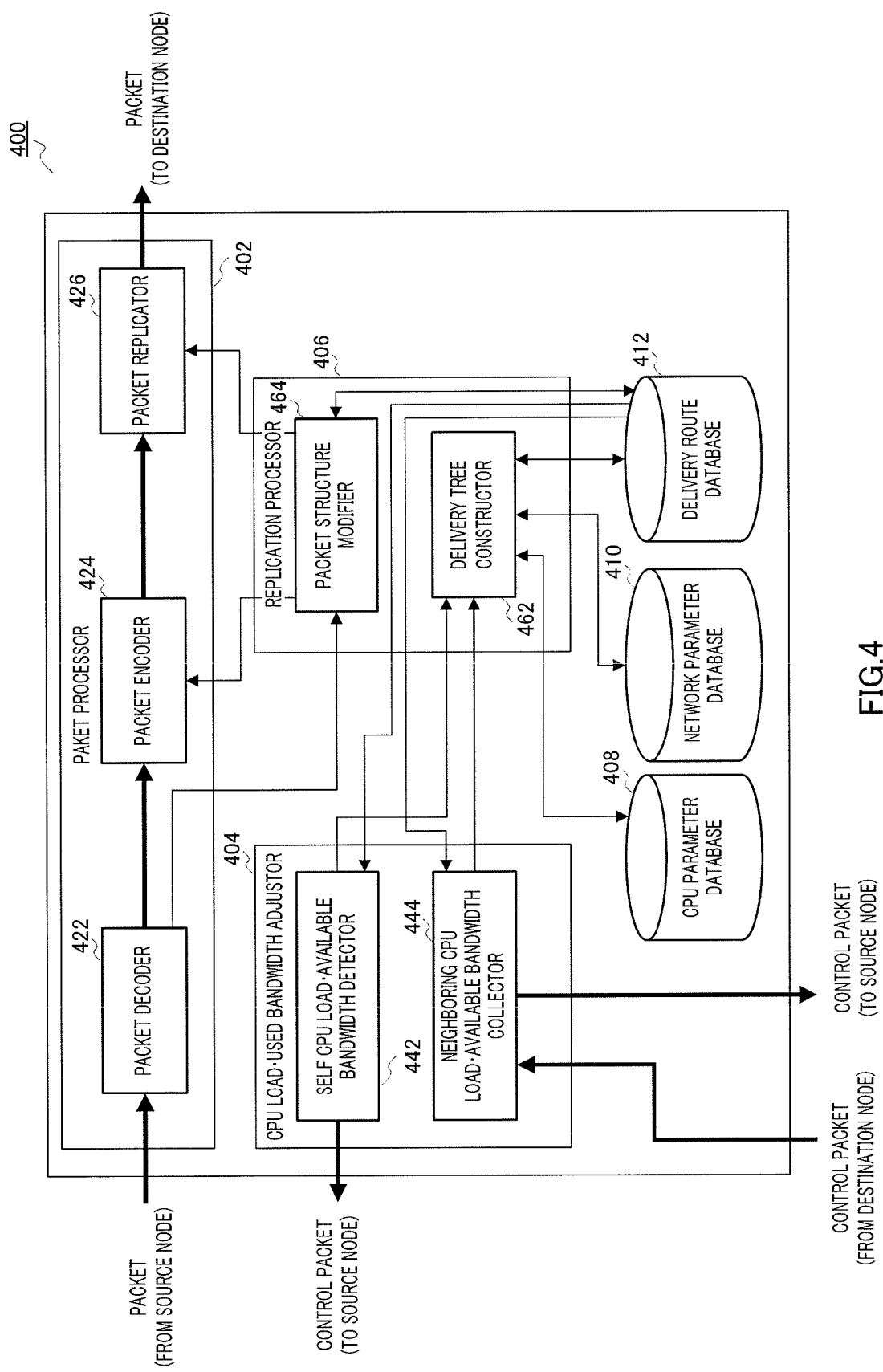
FIG. 4 is a block diagram showing an internal configuration of a node according to an embodiment of the present invention.

FIG. 4 is a block diagram showing an internal configuration of a node according to an embodiment of the present invention. As shown in FIG. 4, node 400 according to the present embodiment is primarily formed with packet processor 402, CPU load-used bandwidth adjustor 404, replication processor 406, CPU parameter database 408, network parameter database 410 and delivery route database 412. Packet processor 402 has packet decoder 422, packet encoder 424 and packet replicator 426. CPU load-used bandwidth adjustor 404 has self CPU load-available bandwidth detector 442 and neighboring CPU load-available bandwidth collector 444. Replication processor 406 has delivery tree constructor 462 and packet structure modifier 464.

Figures 5, 6, 7:
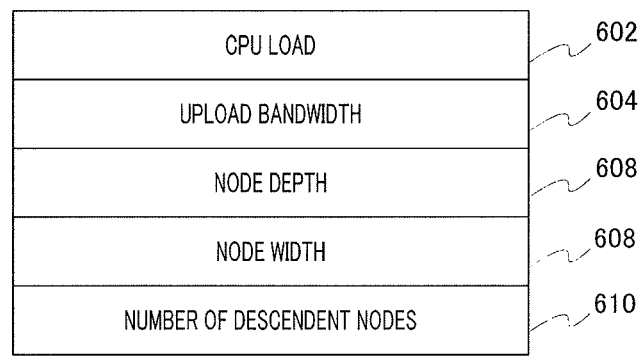
FIG. 5 shows a structure of a CPU parameter stored in a CPU parameter database of a node according to an embodiment of the present invention.
FIG. 6 shows content of a CPU parameter stored in a CPU parameter database according to an embodiment of the present invention.
FIG. 7 shows a configuration of a network parameter stored in a network parameter database of a node according to an embodiment of the present invention.

CPU parameter database 408 stores the CPU parameters of all nodes to constitute a local network, as shown in FIG. 5. The CPU parameters, which show the CPU load condition of each node, as shown in FIG. 6, include CPU load value 602, upload bandwidth 604, node depth 606, node width 608, number of descendent nodes 610, and so on.

As shown in FIG. 7, network parameter database 410 stores the network parameters of all nodes constituting a local network in association with source nodes. The network parameters, which represent the channel bandwidth availability between nodes, include, as shown in FIG. 8, incoming-download link used bandwidth capacity 802, incoming-download link unused bandwidth capacity 804, outgoing-upload link used bandwidth capacity 806, outgoing-upload link unused bandwidth capacity 808, reserved field 810 and so on.

Figures 8, 9:
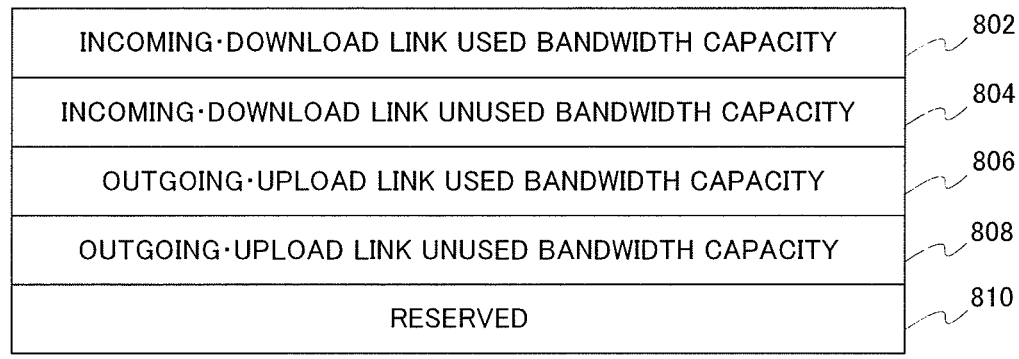
FIG. 8 shows content of a network parameter stored in a network parameter database of a node according to an embodiment of the present invention.
FIG. 9 shows content of delivery route information stored in a delivery route database according an embodiment of the present invention.

As shown in FIG. 9, delivery route database 412 stores delivery route information showing the source node of a packet and destination node of the packet, for each bide constituting a local network. FIG. 9 shows content of delivery route information in the example of FIG. 2A.

Packet decoder 422 decodes an encoded received packet, outputs the result to packet structure modifier 464, and outputs the payload to packet encoder 424. Packet encoder 424 forms a packet by combining the payload input from packet decoder 422 and the header part input from packet structure modifier 464, encodes the formed packet, and outputs the result to packet replicator 426. Given the packet input from packet encoder 424, packet replicator 426 creates replications of a predetermined number designated by packet structure modifier 464, and transmits the replicated packets to a destination designated by packet structure modifier 464.

Self CPU load-available bandwidth detector 442 continues monitoring the CPU load and available bandwidth of the subject node. Then, if the subject node is a source node, self CPU load-available bandwidth detector 442 outputs the CPU parameter and network parameter of the subject node to delivery tree constructor 462. Also, if the subject node is not a source node, self CPU load-available bandwidth detector 442 references delivery route information stored in delivery route database 412, and specifies the source node of the packet. Next, self CPU load-available bandwidth detector 442 transmits a control packet including the CPU parameter and network parameter of the subject node, to the source node of the packet.

Neighboring CPU load-available bandwidth collector 444 receives control packets including CPU parameters and network parameters from other nodes. Then, when the subject node is a source node, neighboring CPU load-available bandwidth collector 444 outputs the CPU parameter and network parameter to delivery tree constructor 462. Also, when the subject node is not a source node, neighboring CPU load-available bandwidth collector 444 references the delivery route information stored in delivery route database 412 and specifies the packet source node. Next, neighboring CPU load-available bandwidth collector 444 transmits a control packet including the CPU parameter and network parameter to the packet source node.

When the subject apparatus is a source node, delivery tree constructor 462 receives as input CPU parameter and network parameter from self CPU load-available bandwidth detector 442 or neighboring CPU load-available bandwidth collector 444. Next, delivery tree constructor 462 determines whether or not the CPU load exceeds a threshold at a certain node or the channel bandwidth availability between certain nodes exceeds a threshold. Then, when it is determined that the threshold is exceeded, delivery tree constructor 462 references the delivery route information stored in delivery route database 412, and specifies the node to receive the packet via that node. Next, delivery tree constructor 462 reselects a delivery route for the specified node, with reference to the CPU parameter and network parameter. Also, delivery tree constructor 462 updates the CPU parameter, network parameter and delivery route information based on the delivery tree reconstruction result. When the subject node is a source node and its CPU is overloaded, delivery tree constructor 462 selects a node of lower node and changes the delivery tree such that the node of low load carries out delivery to other nodes. Also, when the subject node is a source node, delivery tree constructor 462 performs no processing.

When the subject node is a source node, packet structure modifier 464 modifies the header of the input packet from packet decoder 422 in accordance with delivery route information stored in delivery route database 412 and outputs the result to packet encoder 424. Also, when the subject node is not a source node, packet structure modifier 464 outputs the header part of a packet, received as input from packet decoder 422, to packet encoder 424 on an as is basis. Next, packet structure modifier 464 updates the delivery route information stored in delivery route database 412, based on the content of the header part. Also, packet structure modifier 464 gives the number of replicated packets and the destinations of the packets to packet replicator 426 in accordance with the content of the header part (src 304, dest 306 and tree_map 310 in FIG. 3).

Next, an example of the method of optimal delivery route selection in delivery tree constructor 462 will be described.

Delivery tree constructor 462 calculates $|(WID \times a) \times (DES \times b) \times (DEP \times c) \times (UPL \times d) \times (CPL \times e)|$ with respect to all nodes. However, the node width is represented as "WID," the number of nodes is represented as "DES," the node depth is represented as "DEP," the upload bandwidth is represented as "UPL," the CPU load is represented as "CPL," the weight of the node width is represented as "a," the weight of the number of descendent nodes is represented as "b," the weight of the node depth is represented as "c," the weight of the upload bandwidth is represented as "d," and the weight of the CPU load is represented as "e" (a, b, c, d and e are values in the range from 0 to 1).

Then, delivery tree constructor 462 selects nodes where this calculation result is smaller than a predetermined threshold.

Then, from among these selected nodes, delivery tree constructor 462 selects a node that satisfies a specific condition (for example, maximum upload bandwidth).

According to the present invention, when there is need to reconstruct a delivery tree, only the header part of a packet is rewritten, so that a node is able to learn a new delivery route and specify a packet destination simply by deciphering the header part of a received packet. By this means, after a delivery tree is reconstructed by local processing, all terminals are able to identify the changed delivery route quickly.

The disclosure of Japanese Patent Application No. 2009-005924, Jan. 14, 2009, including the specification, drawings and abstract, is incorporated herein by reference in its entirety.

INDUSTRIAL APPLICABILITY

The present invention locally adjusts the bandwidth to use between multipoint nodes by, for example, adjusting the CPU load balance between nodes and avoiding network congestion between nodes, and therefore is suitable for use in packet transfer between terminals.

REFERENCE SIGNS LIST

400 Node
402 Packet processor
404 CPU load-used bandwidth adjustor
406 Replication processor
408 CPU parameter database
410 Network parameter database
412 Delivery route database
422 Packet decoder
424 Packet encoder
426 Packet replicator
442 Self CPU load-available bandwidth detector
444 Neighboring CPU load-available bandwidth collector
462 Delivery tree constructor
464 Packet structure modifier

The invention claimed is:

1. A terminal apparatus in a network that is formed with a plurality of terminal apparatuses and that reconstructs a delivery tree locally, the terminal apparatus comprising:
a delivery tree constructor that, when the terminal apparatus is the terminal apparatus to reconstruct a delivery tree, selects a packet delivery route such that central processing unit load of all terminal apparatuses or channel bandwidth availability between the terminal apparatuses does not exceed a threshold;
a packet structure modifier that, based on the delivery route, rewrites a header part of an input packet, and sets terminal apparatuses to be packet destinations and the number of replicated packets of the terminal apparatus and each destination terminal apparatus; and a packet processor that creates replications of the packet in which the header part is rewritten by the packet structure modifier, the number of the replications of the packet being the number of replicated packets of the terminal apparatus determined by the packet structure modifier, and transmits the replicated packets to each destination terminal apparatus set by the packet structure modifier;

the header part at least comprises:

a first column in which a unique property of the terminal apparatus to reconstruct the delivery tree is written, a second column in which the unique properties of at least one of other terminal apparatuses than the terminal apparatus to reconstruct the delivery tree are written, and a third column in which the number of packets which each terminal apparatus needs to replicate is written, corresponding to the unique properties of the other terminal apparatuses of the second column, the packet structure modifier sets the number of replicated packets and terminal apparatuses to be packet destinations by deciphering the first column, second column and third column in the header part;

the unique properties in the second column are written in order from a terminal apparatus at a top layer in a delivery tree, and, between terminal apparatuses belonging to a same layer, written following an order of terminal apparatuses in a layer one layer above;

information about the number of packets in the third column is written in the order of the unique properties in the first column and second column; and the packet structure modifier sets the information about the number of packets in the third column corresponding to a position of a unique property of the terminal apparatus written in the first column and the second column in the header part, as the number of replicated packets, and, based on the numbers of replicated plackets for a terminal apparatus belonging to a higher layer than the terminal apparatus and for a terminal apparatus belonging to the same layer as the terminal apparatus, sets the terminal apparatuses to be packet destinations from among terminal apparatuses belonging to a layer one layer below the terminal apparatus.

2. A packet transmission method for a terminal apparatus in a network that is formed with a plurality of terminal apparatuses and that reconstructs a delivery tree locally, the method comprising:

when the terminal apparatus is a terminal apparatus to reconstruct a delivery tree, selecting a packet delivery route such that central processing unit load of all terminal apparatuses or channel bandwidth availability between the terminal apparatuses does not exceed a threshold;

modifying a packet structure by, based on the delivery route, rewriting a header part of an input packet, and setting terminal apparatuses to be packet destinations and the number of replicated packets of the terminal apparatus and each destination terminal apparatus; and creating replications of the packet in which the header part is rewritten in the modify a packet structure, the number of the replications of the packet being the number of replicated packets of the terminal apparatus determined in the modifying a packet structure, and transmitting the replicated packets to each destination terminal apparatus set in the modifying a packet structure, wherein the header part at least comprises:

a first column in which a unique property of the terminal apparatus to reconstruct the delivery tree is written, a second column in which the unique properties of at least one of other terminal apparatuses than the terminal apparatus to reconstruct the delivery tree are written, and a third column in which the number of packets which each terminal apparatus needs to replicate is written, corresponding to the unique properties of the other terminal apparatuses of the second column, and the modifying a packet structure sets the number of replicated packets and terminal apparatuses to be packet destinations by deciphering the first column, second column and third column in the header part;

wherein the unique properties in the second column are written in order from a terminal apparatus at a top layer in a delivery tree, and, between terminal apparatuses belonging to a same layer, written following an order of terminal apparatuses in a layer one layer above;

wherein information about the number of packets in the third column is written in the order of the unique properties in the first column and second column; and wherein the modifying a packet structure sets the information about the number of packets in the third column corresponding to a position of a unique property of the terminal apparatus written in the first column and second column in the header part, as the number of replicated packets, and, based on the numbers of replicated plackets for a terminal apparatus belonging to a higher layer than the terminal apparatus and for a terminal apparatus belonging to the same layer as the terminal apparatus, sets the terminal apparatuses to be packet destinations from among terminal apparatuses belonging to a layer one layer below the terminal apparatus.

\* \* \* \* \*